(12) United States Patent
Adogla

(10) Patent No.: US 12,555,424 B2
(45) Date of Patent: Feb. 17, 2026

(54) DATACENTER DETECTION AND AUTHENTICATION TECHNIQUES

(71) Applicant: Oracle International Corporation, Redwood Shores, CA (US)

(72) Inventor: Eden Grail Adogla, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 111 days.

(21) Appl. No.: 18/203,516

(22) Filed: May 30, 2023

(65) Prior Publication Data
US 2024/0404335 A1 Dec. 5, 2024

(51) Int. Cl.
*G07C 9/00* (2020.01)

(52) U.S. Cl.
CPC .............. *G07C 9/00182* (2013.01)

(58) Field of Classification Search
CPC .......... G07C 9/00182; G08B 13/19647; G05B 19/406; G06K 9/00288; G06K 9/00711; H04L 63/0853; H04L 63/105
See application file for complete search history.

(56) References Cited

U.S. PATENT DOCUMENTS

| | | |
|---|---|---|
| 10,671,050 B2 | 6/2020 | Wang et al. |
| 11,258,625 B2 | 2/2022 | Decenzo et al. |
| 2007/0115092 A1* | 5/2007 | Hsu .................. G07C 9/28 340/5.6 |
| 2020/0039081 A1 | 2/2020 | Deyle et al. |
| 2021/0039258 A1* | 2/2021 | Meyers ................ G06V 20/10 |

OTHER PUBLICATIONS

"Autonomous Indoor Drone", Tando™, Indoor Robotics, Available Online at: https://www.indoor-robotics.com/solution/, Accessed from Internet on Aug. 4, 2022, 6 pages.
"Captain DC: The Robot that Ensures Data Centre Surveillance and Security", EconocomTV, Available Online at: https://www.youtube.com/watch?v=Az3ppryWJnl, Dec. 14, 2017, 9 pages.
"Indoor Robotics", Tando™, Available Online at: https://www.indoor-robotics.com/wp-content/uploads/2022/06/IndoorRobotics-2p-new-branding.pdf, 2 pages.
(Continued)

*Primary Examiner* — Vernal U Brown
(74) *Attorney, Agent, or Firm* — Kilpatrick Townsend & Stockton LLP

(57) ABSTRACT

In some implementations, the techniques disclosed herein may include monitoring, by a robotic device, a physical space, the physical space having a portion of a datacenter. In addition, the techniques may include detecting, by the robotic device, a person within the physical space. The techniques may include attempting to authenticate the detected person by an authentication process that includes: prompting, by the robotic device, the detected person to authenticate themselves; receiving, by the robotic device, an authentication credential from the detected person; and determining, by the robotic device, whether the authentication of the detected person has passed. Moreover, the techniques may include in accordance with a determination that the authentication of the detected person has failed, performing an action commensurate with the determination that the authentication has failed.

20 Claims, 10 Drawing Sheets

(56) References Cited

OTHER PUBLICATIONS

"Mobile Robotics for Physical Security of Critical Infrastructure—SMP Robotics", Available Online at: https://smprobotics.com/application_autonomus_mobile_robots/robotics_physical_security/, Accessed from Internet on Aug. 4, 2022, 8 pages.

Ankers, "Collaboration of the Data Center Security Minds—4 Security Trends You Should Know Now", Available Online at: https://services.global.ntt/es-es/insights/blog/collaboration-of-the-data-center-security-minds-4-security-trends-you-should-know-now, Oct. 6, 2021, 4 pages.

Judge, "Switch Plans to Launch Security Robots for Data Centers", Available Online at: https://www.datacenterdynamics.com/en/news/switch-plans-launch-security-robots-data-centers/, Aug. 11, 2020, 2 pages.

Luna et al., "Supervision of a Data Center Using a Fixed Path Robot", International Journal of Computer Engineering and Sciences Research, vol. 4, No. 3, Available Online at: https://www.ijcesr.com/Openaccess/v4i3/IJC856125580.pdf, May-Jun. 2022, pp. 14-23.

Man, "Captain DC Data Center Security Robot", Business & Research, Available Online at: https://www.roboticgizmos.com/captain-dc-data-center/, Dec. 14, 2017, 2 pages.

Miller et al., "Switch Developing Security Robots to Patrol Edge Data Centers", Available Online at: https://datacenterfrontier.com/switch-developing-security-robots-to-patrol-edge-data-centers/, Aug. 10, 2020, 5 pages.

Swinhoe, "Drones at (and Even in) a Data Center", Do Today's Mega-Campuses Need Aerial Security as Much as Human Patrols?, Available Online at: https://www.datacenterdynamics.com/en/analysis/drones-at-and-even-in-a-data-center/, Jun. 9, 2022, 8 pages.

Swinhoe, "Novva Data Centers to Deploy Customized Boston Dynamics Robot in Utah", Company partners with Brigham Young University to deploy Spot robots for monitoring and security, Available Online at: https://www.datacenterdynamics.com/en/news/novva-data-centers-to-deploy-customized-boston-dynamics-robot-in-utah/, Sep. 10, 2021, 3 pages.

* cited by examiner

DATACENTER DETECTION AND AUTHENTICATION TECHNIQUES

BACKGROUND

Access to datacenter computing devices is restricted to prevent tampering with hardware that can lead to data breaches. Traditionally, access is physically restricted by physical barriers such as cages around servers. However, these physical barriers are expensive to build and cumbersome to use. Accordingly, improvements to datacenter security techniques are desirable.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

In various embodiments, techniques may include monitoring, by a robotic device, a physical space, the physical space having a portion of a datacenter. The techniques may also include detecting a person within the physical space. The techniques may furthermore include attempting to authenticate the detected person by an authentication process. The authentication process can include prompting the detected person to authenticate themselves. The authentication process can include receiving an authentication credential from the detected person. The authentication process can include determining whether the authentication of the detected person has passed. The techniques may include performing an action commensurate with the determination that the authentication has failed in accordance with a determination that the authentication of the detected person has failed. Other embodiments of this aspect include corresponding methods, computer systems, apparatus, and computer programs recorded on one or more computer storage devices, each configured to perform the actions of the techniques.

Implementations may include one or more of the following features. Techniques where the detected person is authenticated for a time period. Techniques where the detecting further may include: receiving a request to authenticate the person, the request having a wake phrase. Techniques where the robotic device is configured to move towards a source of the request to authenticate the person. The techniques may include techniques where the person is attempted to be authenticated while the person remains in the physical space. The techniques may include: in response to a determination that the authentication of the detected person has passed, transmitting an instruction to open a lock. The techniques may include techniques where the authentication process further may include: storing a multimedia recording of the authentication process. Implementations of the described techniques may include hardware, a method or process, or a computer tangible medium.

DETAILED DESCRIPTION

Figure 1:
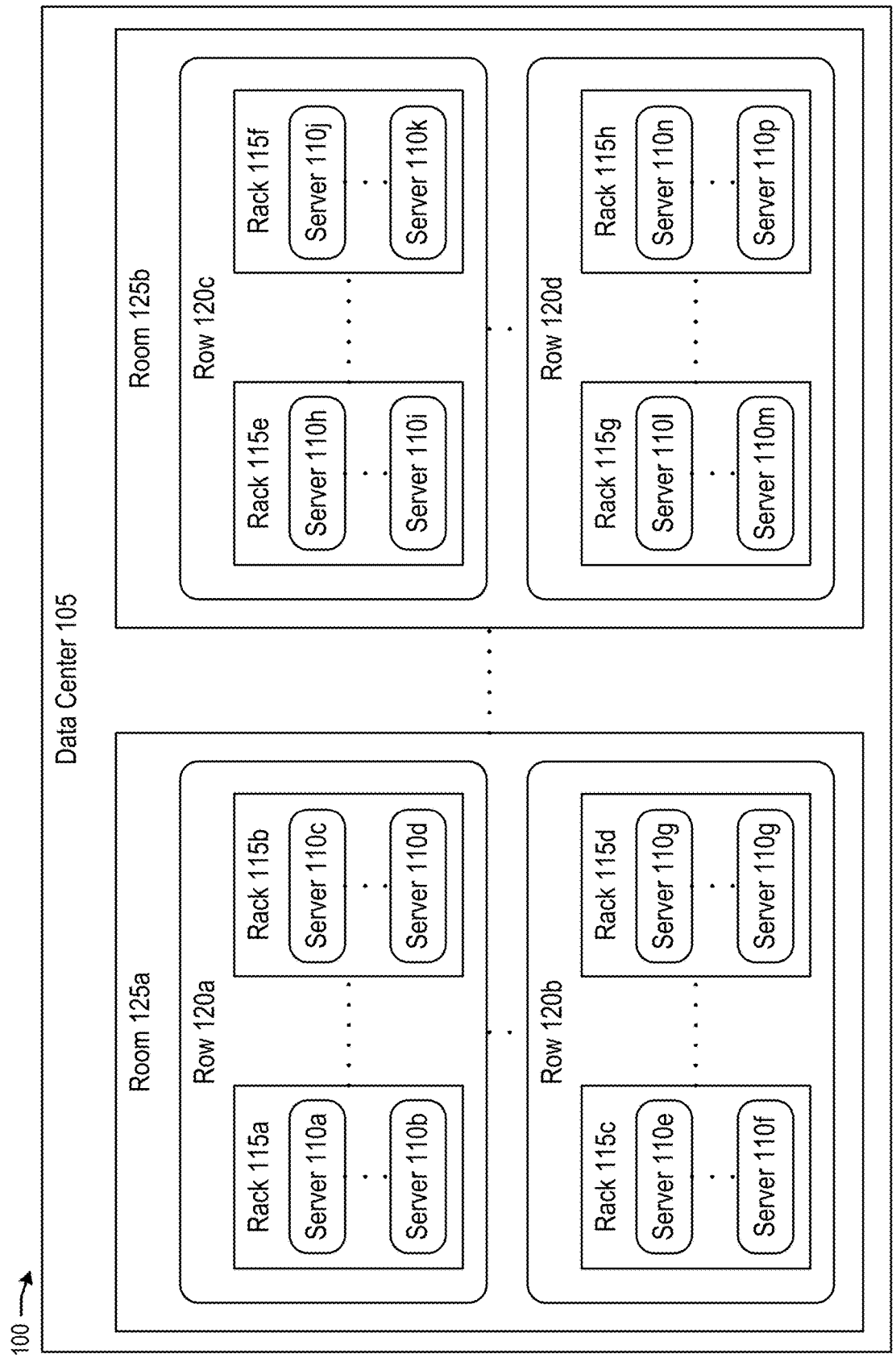
FIG. 1 shows a simplified diagram of a datacenter according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A datacenter is a physical space that houses server computers and other networked computing devices. Typically, a datacenter is managed by a cloud service provider that provides customers with access to the datacenter's servers. These computing devices are accessible through a network connection, but physical access to the datacenter is restricted to prevent hardware theft or tampering with the devices which may include sensitive information such as personally identifiable information (PII) or financial data. For example, the servers may host a company's payroll data, or the servers can be used to process payments for a website.

Increasingly, cloud service providers are allowing customers to construct their own datacenters on a customer designated location using the provider's infrastructure and servers (e.g., an on-premises datacenter). Customers may wish to locate their servers at a specific location to reduce latency or to comply with data localization policies. For example, the customer may wish to locate the server at one of the customer's facilities. Latency can be reduced by these on premises servers if they are located at or near the customer's facilities because messages to servers that are collocated with a customer's staff travel a shorter distance, and will arrive faster, than messages sent to a centralized datacenter in a different city. In addition, some jurisdictions have data localization policies that dictate where certain types of data can be located. For instance, some governments may require that governmental data (e.g., tax records) are located on servers inside of the government's territory. Accordingly, some customers may wish to store data on servers located outside of a cloud service provider's datacenter (e.g., in a third-party datacenter or at a customer facility).

However, techniques for restricting physical access to servers can be impractical and expensive for small scale on premises operations because physical security usually provided through specially constructed facilities staffed by on site security personnel. In addition, these specialized facilities can take years to build and provision adding time and expense to each new on premises datacenter. These specialized facilities are also inflexible because much of the layout for a physical security is determined at design time and such facilities cannot be easily altered once the facility has been constructed. Accordingly, the customer may struggle to convert an existing facility into a datacenter, to scale an existing on premises facility, or to create a small on premises datacenter without economies of scale (e.g., paying a single security guard to watch a single rack of servers is not cost effective when compared to having the guard watch a room of servers).

Physical security for an on-premises datacenter can be provided using robotic devices that patrol an on-premises datacenter for unauthorized personnel. Upon or after detecting an individual in the datacenter, the robotic device can prompt the person to authenticate themselves with the device. For instance, the robotic device could request one or more forms of authentication such as an alphanumeric passcode, biometric authentication techniques such as an iris scan, and a one-time password from a third-party authenticator. Authenticating a person can include authorizing that person by giving that person permission to be in one or more areas of the datacenter or perform one or more actions in the datacenter (e.g., to access a particular server). After authentication, the robotic device can escort the authenticated person to the appropriate server, monitor the person's behavior, and escort the person from the datacenter at the conclusion of their visit. If the detected individual is not authenticated, the robotic device can summon help (e.g., call the police) and take countermeasures to prevent the individual from accessing the servers. For instance, the robotic device can use a siren and strobe light to disorient the individual.

Physical security enforced by a robotic device has a number of advantages over traditional datacenter security techniques such as cages for servers and on premises security guards. A robotic device can be instructed to patrol an area with limited preparation while a cage could take months to design, order, and install. In addition, the robotic device can allow for flexible datacenter designs that can be revised through changes to the devices software rather than physically restructuring the datacenter. In addition, the robotic device's behavior can be scheduled, randomized, or periodically updated so that attackers cannot predict the datacenter's security measures.

In an illustrative example, a company wants to create a datacenter in a converted office space at a company's regional headquarters. The datacenter is set up in a location that would be unfeasible to convert to a datacenter using traditional datacenter security techniques. The company opts to patrol the datacenter with robotic devices and begins hosting servers in the converted office space. An employee enters the datacenter to replace a network interface card on one of the servers, and, after entering the datacenter, a robotic device greets the employee and asks for authentication information. The employee swipes her badge and submits to an iris scan to authenticate. After authentication, the robotic device escorts the employee to the server, monitors her performance, and escorts her out of the datacenter at the conclusion of her task.

FIG. 1 shows a simplified diagram 100 of a datacenter according to various embodiments. A datacenter 105 can be a physical location that hosts one or more servers, such as servers 110a-110h, and the infrastructure for those servers such as networking hardware, cooling systems, and storage devices. Robotic device(s) can monitor some or all of the datacenter to detect intrusion into the datacenter. A server can be a computing device that hosts programs called clients, and the datacenter's networking hardware can enable remote users to interact with the clients. One or more of these servers can be organized into groups of servers 110a-110p called racks (e.g., racks 115a-115h). The racks 115a-115h can be mounted to a physical rack (e.g., a frame or enclosure) in some circumstances. In other circumstances, the racks 115a-115h can be an organizational unit and the racks 115a-115h may not be collocated in a single frame or enclosure.

Racks 115a-115h can be organized into groups of racks called rows (e.g., row 120a, row 120b, row 120c, or row 120d). In some implementations, the rows can be a number of racks in a straight line. In other implementations, rows such as row 120a, row 120b, row 120c, or row 120d can be an organizational unit and the racks 115a-115h can be placed in different locations. Rows 120a-120d can be organized into groups of rows called rooms such as room 125a or room 125b. A room (e.g., room 125a) can be a subdivision of a building or a physical enclosure such as a cage in some embodiments. In other embodiments, room 125a or room 125b can be an organizational unit and the rooms can be located in different physical locations or multiple rooms can be located in a single subdivision of a building.

Figure 2:
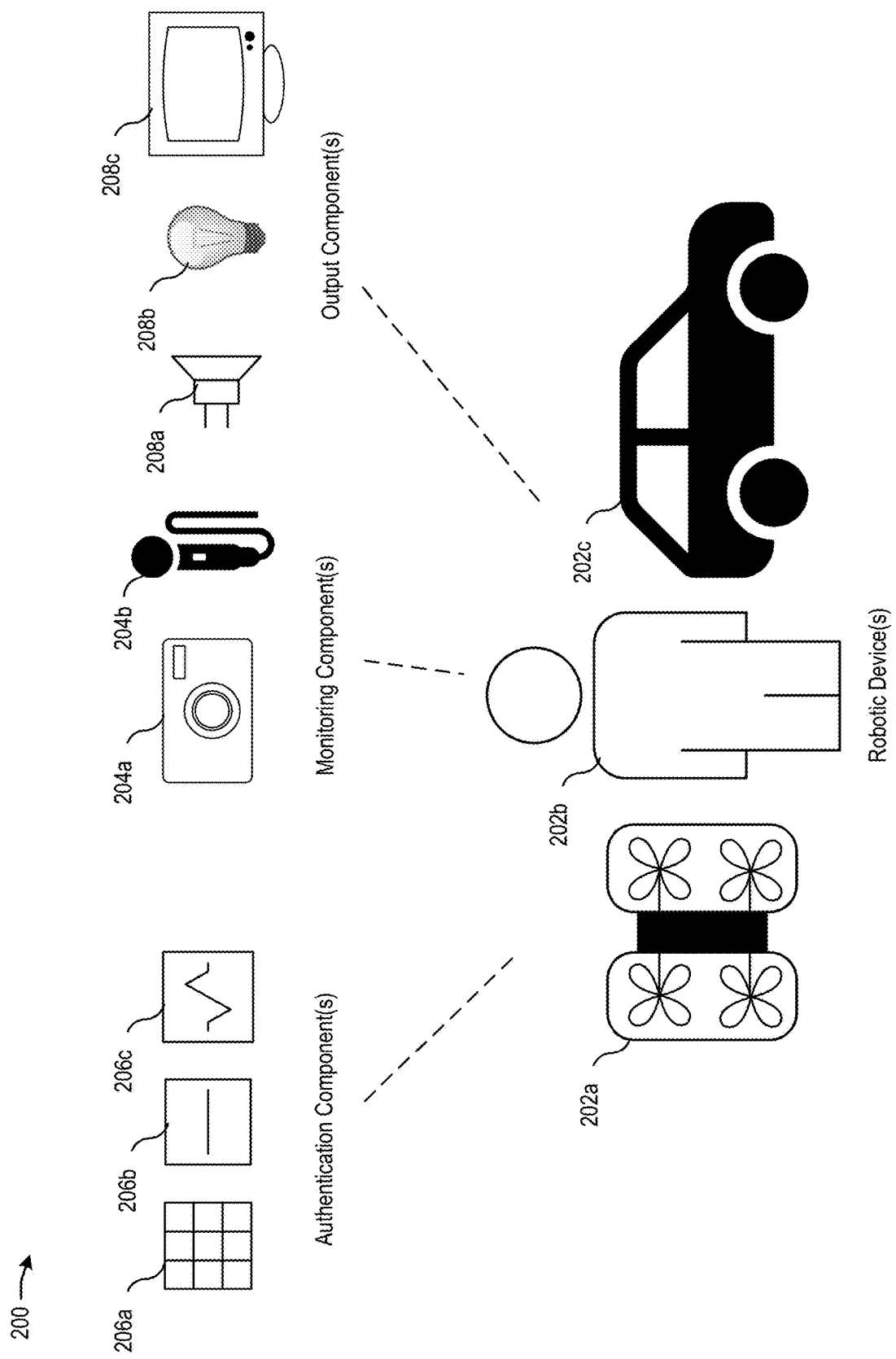
FIG. 2 shows a simplified diagram 200 of example robotic devices according to embodiments of the present disclosure.

FIG. 2 shows a simplified diagram 200 of example robotic devices according to embodiments of the present disclosure. Robotic device(s) 202a-202c can include any mobile electronic device that is capable of monitoring one or more physical location(s) (e.g., monitored location(s)) such as a room, a group of rooms, a subdivision of a building, an entire building, a campus, and the like. In addition, the robotic device(s) 202a-202c can monitor multiple physical locations that may not form a single contiguous area and the device(s) can move through unmonitored areas to travel between these physical locations.

During the monitoring, the robotic device(s) 202a-202c can use various components to perform tasks in the monitored location(s). These tasks can include detecting the presence of individuals in the monitored location, authenticating any detected individuals, or raising alarm in the event that an individual cannot be authenticated by the robotic devices. The robotic devices can perform other tasks, and, for example, the robotic device can monitor the monitored location for changes (e.g., identifying changes to the objects in the monitored location using a machine learning model that is trained to perform object detection), impeding an individual who cannot be authenticated (e.g., triggering strobe lights to disorient the individual), or guiding an authenticated individual to their destination.

The robotic device(s) 202a-202c can be capable of independent movement so that the device(s) can patrol the monitored area. For example, the robotic device(s) 202a-202c can include unmanned aerial vehicles such as a quadcopter (e.g., robotic device 202a) that is capable of moving within a building by controlling an array of rotors. The robotic device(s) 202a-202c can also include legged robots, such as robotic device 202b, that use articulated limbs to move within the monitored location. The robotic devices can also include a wheeled device, like robotic device 202c, that controls one or more wheels to move through the monitored location. In addition, the robotic devices 202a-202c can use other forms of locomotion to patrol the monitored location. For example, the forms of locomotion can include walking, rolling, hopping, metachronal motion, slithering, brachiating, or any combination of the techniques in this disclosure.

The robotic device(s) 202a-202c can check for intrusions into the monitored location using one or more monitoring components 204a-204b such as camera(s) 204a or microphone(s) 204b. The camera(s) 204a can be used to provide images input to the robotic device's processor(s). The input images can be still pictures, or frames from a video feed. In addition, these input images can be two-dimensional images or three-dimensional images. The processor(s) can use various computer vision techniques to detect any person(s) in the images (e.g., image classification, object detection, instance segmentation, panoptic segmentation, key point detection, person segmentation, three-dimensional object recognition, and the like). The computer vision techniques can, in addition or alternatively, be used to identify objects in the monitored location and the robotic device(s) 202a-202c can use the identified objects to determine whether objects in the datacenter have been moved, altered, removed, or added. The computer vision techniques can include a machine learning model that is trained to detect and track object(s) or person(s).

The camera(s) 204a can be used by the robotic device(s) 202a-202c to navigate in the monitored location. For example, the robotic device(s) 202a-202c can use visual odometry techniques to determine the robotic device's position and orientation in the monitored location by comparing sequential images from the camera(s) 204a. During visual odometry, the processor(s) of robotic device(s) 202a-202c can be used to identify features in the images, and movement can be determined by comparing the position of the detected features in sequential images. In addition, tracking techniques can be used to associate identified object(s) or person(s) in sequential images so that the robotic device(s) 202a-202c can follow the identified object(s) or person(s). These techniques can be used by the robotic device to track a detected person or object within the datacenter.

Microphone(s) 204b can be used to detect sounds that may indicate that a person has entered the monitored location. The monitoring can include detecting sounds above a sound threshold and initiating a sweep (e.g., patrol) of the monitored location in response to the detected sounds. In some embodiments, the microphone(s) 204b can be used to detect specific sounds such as breaking glass, doors opening/closing, running water, speech, footsteps, and the like. The microphone(s) 204b can be an array of microphones that can use sound localization techniques to identify the source of a detected sound so that the robotic device(s) 202a-202c can move to the source.

The robotic device(s) 202a-202c can be used to authenticate person(s) entering the monitored location. A person entering the monitored location can summon the robotic device(s) 202a-202c using the microphone(s) 204b. The summoned robotic device, or a robotic device that otherwise encounters the person, can authenticate the person using one or more forms of authentication. For instance, the forms of authentication can include an alphanumeric code provided via an input device 206a (e.g., touchscreen, keypad, keyboard, etc.), a keycard provided via a key reader 206b (e.g., magnetic card reader, near-field communication (NFC) reader, radio frequency identification (RFID) reader, etc.), or a biometric reading (e.g., fingerprint, iris scan, facial image, voice sample, etc.) provided via a biometric device.

In some circumstances, the robotic device may not be able to authenticate a detected person. The robotic device(s) 202a-202c can instruct the detected person to remain stationary, remain within a set area (e.g., "please do not leave this room"), or to go to a specified location (e.g., "please stand by the door"). The robotic device(s) 202a-202c may keep a recording for the duration of an interaction with a particular individual or for the entire time that the robotic device(s) are active. The robotic device 202a-202c can instruct the detected person, audibly through a speaker(s) 208a, visually by changing the color or blinking pattern of light(s) 208b, or by displaying images or words on display device(s) 208c. An additional robotic device, a security guard, an employee of the datacenter, or local law enforcement can be summoned by the robotic device(s) 202a-202c.

If the detected person disobeys the instructions from the robotic device(s) 202a-202c, the robotic device can interfere with the detected person's activities in the datacenter. For instance, speaker(s) 208a can sound an alarm, issue warnings, or otherwise make disruptive sounds that interfere with the detected person's activities. Light(s) 208b can be used by the robotic device(s) 202a-202c to disrupt the detected person's activity by flashing lights to disorient the person (e.g., strobe lights). In addition, the robotic device(s) 202a-202c can get in the way of the detected person and physically impede the person's progress, or release smoke or oil to make it more difficult for the detected person to move around the datacenter.

Figure 3:
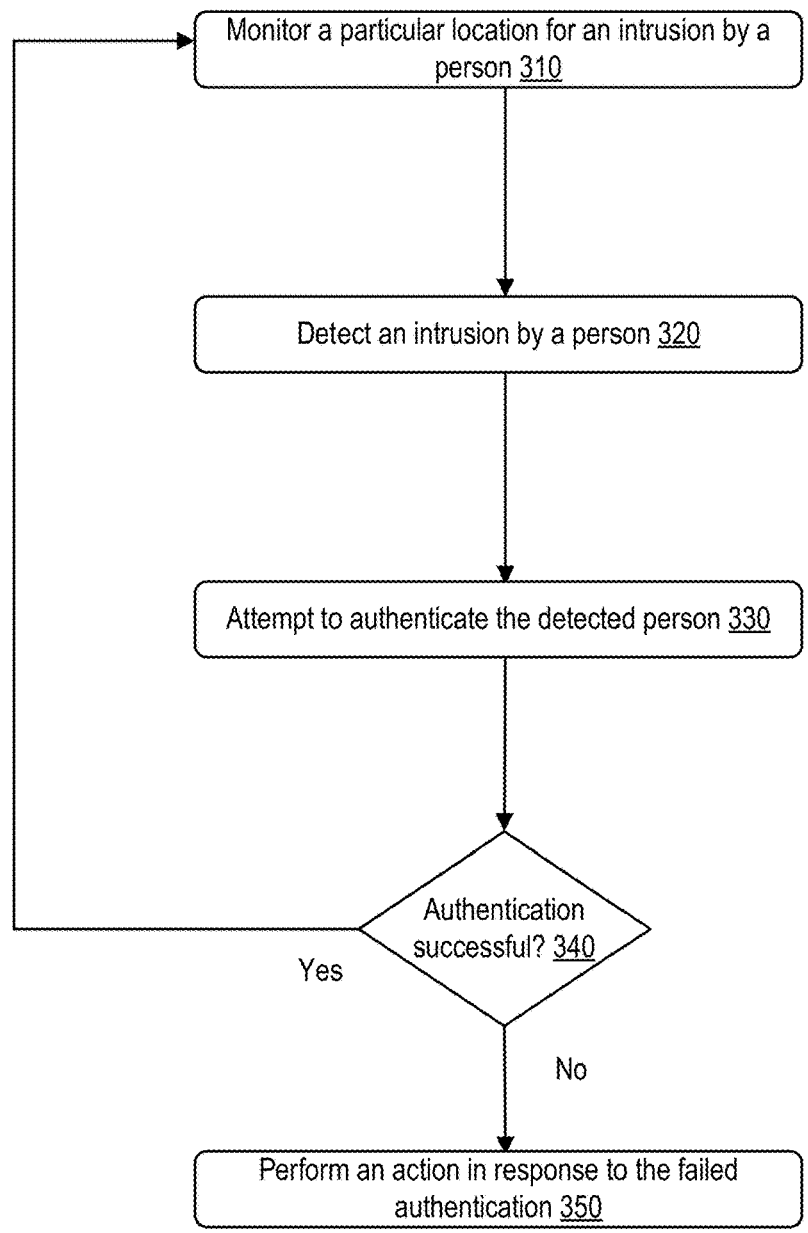
FIG. 3 is a simplified flowchart of a process for monitoring an area for an intrusion according to various embodiments.

FIG. 3 is a simplified flowchart of a process 300 for monitoring an area for an intrusion according to various embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 300 in greater detail, at block 310, a particular location can be monitored for intrusion by a person. The monitoring can be performed by one or more camera(s) mounted in or around the particular location, or the monitoring can be performed by one or more robotic devices patrolling the monitored area (e.g., particular location). The particular location can be one or more rooms or one or more subdivisions of a room.

At block 320, an intrusion by a person may be detected. For instance, camera (e.g., a mounted camera or a camera on a robotic device(s) 202a-202c) can visually detect that a person is present in the particular location. Sensors other than cameras can be used to detect intrusions. For example, microphones (e.g., mounted microphones or microphones on the robotic device(s) 202a-202c) can monitor for and localize sounds that indicate an intrusion such as footsteps, opening or closing doors or enclosures, breaking glass, or sounds caused by tools.

In some embodiments, the sounds that indicate that an intrusion has occurred may be sufficient for the robotic device(s) 202a-202c to raise an alarm or the sounds may prompt the robotic devices to search for the origin of the sounds before raising an alarm. Some robotic devices may be charging while other devices patrol the particular location, and the charging devices may leave charging and begin to patrol in response to detected sounds that indicate an intrusion has occurred. The robotic device(s) 202a-202c may patrol until a person is detected, until the devices are told to stand down, or until a timer has expired.

At block 330, the robotic device(s) 202a-202c can attempt to authenticate the detected person from 320. The robotic device(s) 202a-202c can attempt to authenticate the detected person using various techniques such as facial recognition, voice recognition, gait recognition, iris scans, fingerprint scans, passphrases, passcodes, keycards, etc. Multiple forms of authentication, or rotating forms of authentication, may be used to authenticate a detected person. The person's identity may be cross referenced with work orders or scheduling information to determine if the detected person is supposed to be in the particular location. The robotic device(s) 202a-202c can create a log of the people who were authenticated during a time period.

At block 340, whether the authentication was successful can be determined. If the authentication from 330 fails, process 300 can precede to block 350. If the authentication from 330 is successful, the process can return to block 310 and the robotic device(s) 202a-202c can continue to monitor the particular location. Authentication may be performed multiple times before a final determination that a person is authenticated is made.

At block 350, an action in response to the failed authentication from 340 can be performed. An action in response to failed authentication can include alerting one or more persons such as the datacenter asset provider, the company hosting the datacenter, a government agency, security staff at the datacenter, etc. The robotic device(s) 202a-202c may interfere with the activities of the detected person by, for example, placing the robotic device in the way of the detected person, releasing smoke to obscure the detected person's movements, releasing liquid to make the detected person's movement difficult, triggering doors within the datacenter to lock, triggering strobe lights, triggering alarms, restraining the detected person, etc.

Figure 4:
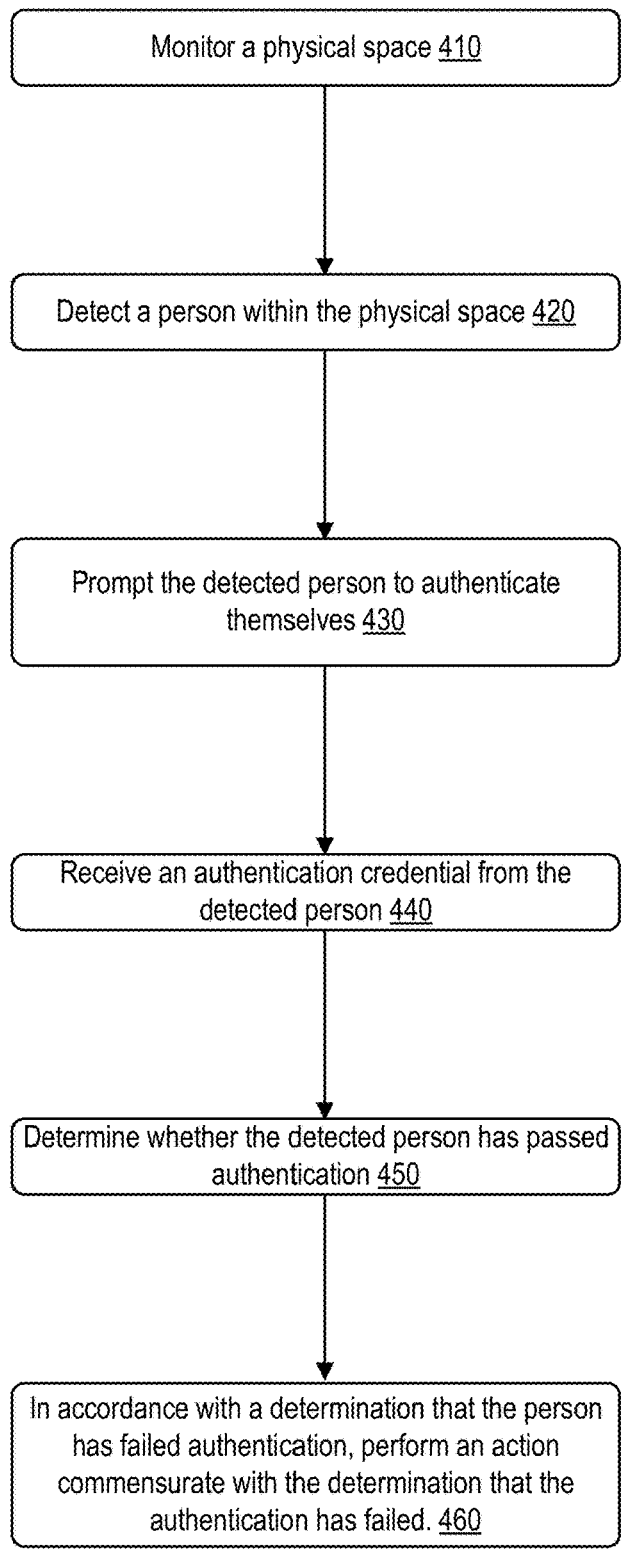
FIG. 4 is a simplified flowchart of a process for authenticating a person according to various embodiments.

FIG. 4 is a simplified flowchart of a process 400 for authenticating a person according to various embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 400 in greater detail, at block 410, a physical space can be monitored. The physical space can be monitored by a robotic device such as robotic device(s) 205a-205c, and the physical space can be a portion of a datacenter (e.g. a room(s), a portion of a room). The room may be monitored by other devices such as microphones or cameras.

At block 420, a person can be detected in the physical space. The person can be detected using one or more of camera(s) 204a or microphone(s) 204b. The person may be detected when a person makes a request to authenticate. The request can be made through speech, gestures, or a command through an electronic device (e.g., phone application), and the robotic device can move towards the source of the request in response to detecting the request. The speech used to request authentication can be a wake phrase (e.g., a particular word or combination of words that trigger an action by the robotic device). The robotic device(s) 202a-202c can create a recording of the authentication process starting at or before block 420.

At block 430, the robotic device (e.g., robotic device(s) 202a-202c) can attempt to authenticate the detected person from 420 by prompting the person to authenticate themselves. The robotic device can prompt the person to authenticate themselves by presenting interfaces for receiving authentication credentials, or by instructing the detected person to provide the authentication credentials to an electronic device (e.g., wall mounted biometric scanner).

At block 440, an authentication credential can be received from the detected person from 420. The authentication credential can be received at a robotic device such as robotic device(s) 202a-202c. The robotic device(s) 202a-202c may require multiple authentication credentials before the detected person can be authenticated. The authentication credentials can include biometric features (e.g., eyes, palmprints, fingerprints, height, or other physical features), keycards, passcodes, passwords, gestures, etc. The credentials can include a work order that indicates which servers the detected person is authorized to interact with.

At block 450, whether the detected person from 420 has passed authentication can be determined by a robotic device (e.g., robotic device(s) 202a-202c). The detected person may be authenticated for a time period, or the person may be authenticated while the person remains in the physical space (e.g., the person is authenticated until they leave the physical space). The robotic device(s) 202a-202c may determine that the detected person is no longer authenticated based on the person's actions. For example, the robotic device may determine that the detected person has entered an area that the person was not authorized to enter or that the person has begun to work on a server that is not identified in a work order.

At block 460, an action commensurate with the determination that the authentication has failed can be performed in accordance with a determination that the detected person from 420 has failed authentication at 450. The action can include placing the robotic device in the way of the detected person, releasing smoke to obscure the detected person's movements, releasing liquid to make the detected person's movement difficult, triggering doors within the datacenter to lock, triggering strobe lights, triggering alarms, restraining the detected person, etc.

Figure 5:
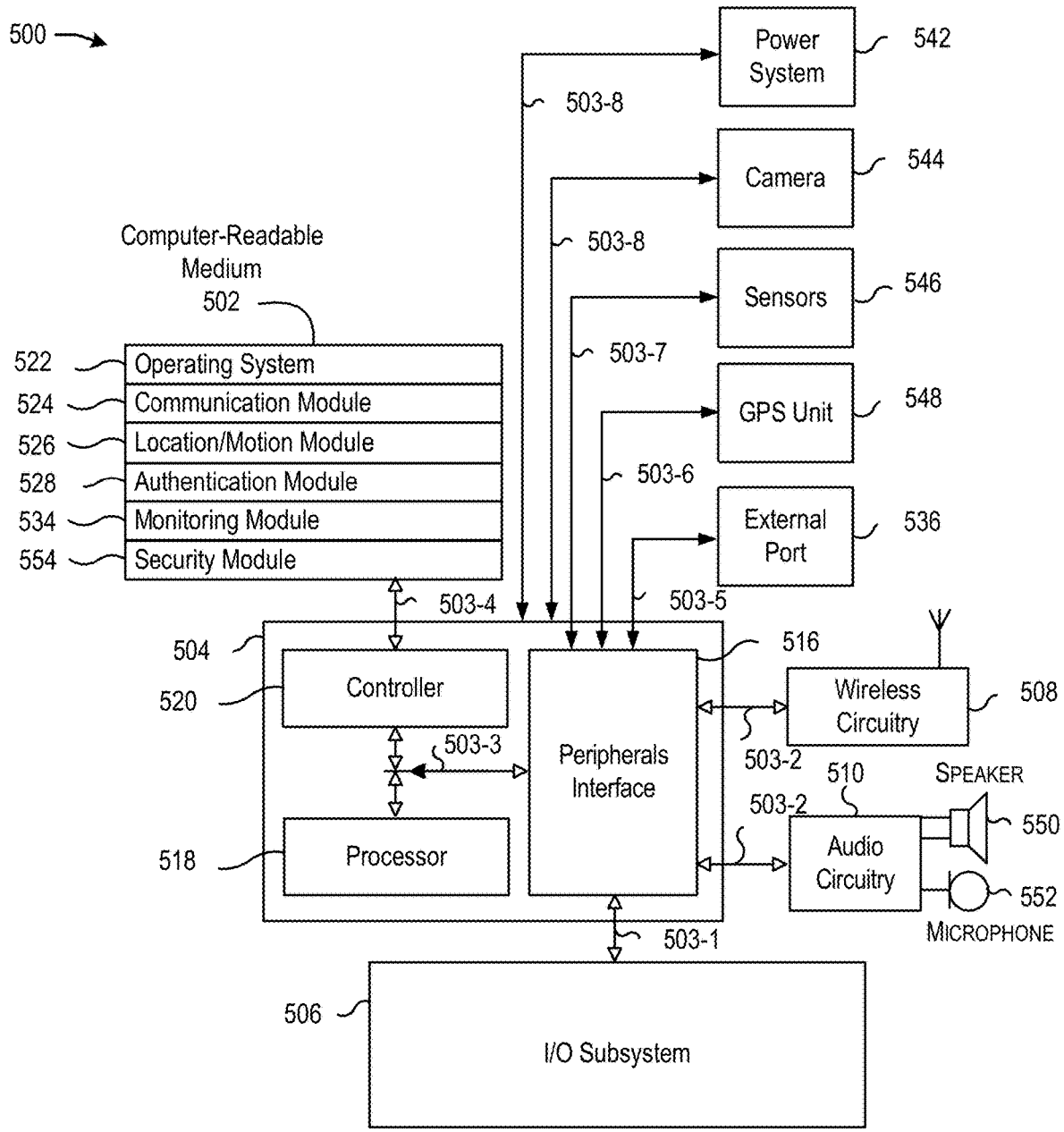
FIG. 5 is a block diagram of an example electronic device 500 according to various embodiments.

FIG. 5 is a block diagram of an example electronic device 500 according to various embodiments. Device 500 generally includes computer-readable medium 502, control circuitry 504, an Input/Output (I/O) subsystem 506, wireless circuitry 508, and audio circuitry 510 including speaker 550 and microphone 552. These components may be coupled by one or more communication buses or signal lines 503. Device 500 can be any electronic device, including robotic device(s) 202a-202c, a computer, a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 5 is only one example of an architecture for device 500, and that device 500 can have more or fewer components than shown, or a different configuration of components. The various components shown in FIG. 5 can be implemented in hardware, software, or a combination of both hardware and software, including one or more signal processing and/or application specific integrated circuits.

Wireless circuitry 508 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 508 can use various protocols, e.g., as described herein. In various embodiments, wireless circuitry 508 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VOIP), near field communication protocol (NFC), a protocol for email, instant messaging, and/or a short message service (SMS), or any other suitable communication protocol, including communication protocols not yet developed as of the filing date of this document.

Wireless circuitry 508 is coupled to control circuitry 504 via peripherals interface 516. Peripherals interface 516 can include conventional components for establishing and maintaining communication between peripherals and. Voice and data information received by wireless circuitry 508 (e.g., in speech recognition or voice command applications) is sent to one or more processors 518 via peripherals interface 516. One or more processors 518 are configurable to process various data formats for one or more application programs 534 stored on medium 502.

Peripherals interface 516 couple the input and output peripherals of device 500 to the one or more processors 518 and computer-readable medium 502. One or more processors 518 communicate with computer-readable medium 502 via a controller 520. Computer-readable medium 502 can be any device or medium that can store code and/or data for use by one or more processors 518. Computer-readable medium 502 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 516, one or more processors 518, and controller 520 can be implemented on a single chip, such as control circuitry 504. In some other embodiments, they can be implemented on separate chips.

Processor(s) 518 can include hardware and/or software elements that perform one or more processing functions, such as mathematical operations, logical operations, data manipulation operations, data transfer operations, controlling the reception of user input, controlling output of information to users, or the like. Processor(s) 518 can be embodied as one or more hardware processors, microprocessors, microcontrollers; field programmable gate arrays (FPGAs), application-specified integrated circuits (ASICs), or the like.

Device 500 may include storage and processing circuitry such as control circuitry 504. Control circuitry 504 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 504 may be used to control the operation of device 500. This processing circuitry may be based on one or more microprocessors, microcontrollers, digital signal processors, baseband processor integrated circuits, application specific integrated circuits, etc.

Control circuitry 504 may be used to run software on device 500, such as internet browsing applications, voice-over-internet-protocol (VOIP) telephone call applications, email applications, media playback applications, operating system functions, etc. To support interactions with external equipment, control circuitry 504 may be used in implementing communications protocols. Communications protocols that may be implemented using control circuitry 504 include internet protocols, wireless local area network protocols (e.g., IEEE 802.11 protocols-sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 500 may include input/output subsystem 506. Input/output subsystem 506 may include input-output devices. Input/output devices may be used to allow data to be supplied to device 500 and to allow data to be provided from device 500 to external devices. Input/output devices may include user interface devices, data port devices, and other input-output components. For example, input/output devices may include one or more displays (e.g., touch screens or displays without touch sensor capabilities), one or more image sensors 544 (e.g., digital image sensors), motion sensors, microphones, and speakers 550. Input-output device may also include buttons, joysticks, scrolling wheels, touch pads, key pads, keyboards, microphones 552, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 500 also includes a power system 542 for powering the various hardware components. Power system 542 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 500 includes an image sensor 544 (e.g., a camera). In some embodiments, device 500 includes sensors 546. Sensors can include accelerometers, compass, gyrometer, pressure sensors, audio sensors, light sensors, barometers, and the like. Sensors 546 can be used to sense location aspects, such as auditory or light signatures of a location.

In some embodiments, device 500 can include a Global Positioning System (GPS) receiver, sometimes referred to as a GPS unit 548. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 518 run various software components stored in medium 502 to perform various functions for device 500. In some embodiments, the software components include an operating system 522, a communication module 524 (or set of instructions), a location module 526 (or set of instructions), a ranging module 528 that is used as part of ranging operation described herein, and other application programs 534 (or set of instructions).

Operating system 522 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 524 facilitates communication with other devices over one or more external ports 536 or via wireless circuitry 508 and includes various software components for handling data received from wireless circuitry 508 and/or external port 536. External port 536 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 526 can assist in determining the current position (e.g., coordinates or other geographic location identifiers) and motion of device 500. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 526 receives data from GPS unit 548 and analyzes the signals to determine the current position of the mobile device. In some embodiments, location/motion module 526 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 508 and is passed to location/motion module 526. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 500 based on the position coordinates of the corresponding transmitters. Regardless of the specific location technology used, location/motion module 526 receives information from which a location fix can be derived, interprets that information, and returns location information, such as geographic coordinates, latitude/longitude, or other location fix data.

Ranging module 528 can send/receive ranging messages to/from an antenna, e.g., connected to wireless circuitry 508. The messages can be used for various purposes, e.g., to identify a sending antenna of a device, determine timestamps of messages to determine a distance of mobile device 500 from another device. Ranging module 528 can exist on various processors of the device, e.g., an always-on processor (AOP), a UWB chip, and/or an application processor. For example, parts of ranging module 528 can determine a distance on an AOP, and another part of the ranging module can interact with a sharing module, e.g., to display a position of the other device on a screen in order for a user to select the other device to share a data item. Ranging module 528 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 500 (e.g., portions of the display cover layer, portions of a plastic antenna window in a metal housing sidewall portion of housing, etc.). With one illustrative configuration, some or all of rear face of device 500 may be formed from a dielectric. For example, the rear wall of housing may be formed from glass plastic, ceramic, other dielectric. In this type of arrangement, antennas may be mounted within the interior of device 500 in a location that allows the antennas to transmit and receive antenna signals through the rear wall of device 500 (and, if desired, through optional dielectric sidewall portions in housing). Antennas may also be formed from metal sidewall structures in housing and may be located in peripheral portions of device 500.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 500 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 500 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 500. As an example, antennas may be mounted at one or both ends of device 500 (e.g., along the upper and lower edges of housing, at the corners of housing, etc.).

Antennas in device 500 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 500 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 544 may include one or more visible digital image sensors (visible-light cameras) and/or one or more infrared digital image sensors (infrared-light cameras). Image sensors 544 may, if desired, be used to measure distances. For example, an infrared time-of-flight image sensor may be used to measure the time that it takes for an infrared light pulse to reflect back from objects in the vicinity of device 500, which may in turn be used to determine the distance to those objects. Visible imaging systems such as a front and/or rear-facing camera in device 500 may also be used to determine the position of objects in the environment. For example, control circuitry 504 may use image sensors 544 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 504 may rely entirely upon image sensors 544 to perform simultaneous localization and mapping, or control circuitry 504 may synthesize image data with range data from one or more distance sensors (e.g., light-based proximity sensors). If desired, control circuitry 504 may use display to display a visual representation of the mapped environment.

Input-output devices may include motion sensor circuitry 546. Motion sensor circuitry 546 may include one or more accelerometers (e.g., accelerometers that measure acceleration along one, two, or three axes), gyroscopes, barometers, magnetic sensors (e.g., compasses), image sensors (e.g., image sensor 544) and other sensor structures. Sensors 546 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 504 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 504. Movement generation circuitry may include electromechanical actuator circuitry that, when driven, moves device 500 in one or more directions. For example, movement generation circuitry may laterally move device 500 and/or may rotate device 500 around one or more axes of rotation. Movement generation circuitry may, for example, include one or more actuators formed at one or more locations of device 500. When driven by a motion control signal, actuators may move (e.g., vibrate, pulse, tilt, push, pull, rotate, etc.) to cause device 500 to move or rotate in one or more directions. The movement may be slight (e.g., not noticeable or barely noticeable to a user of device 500), or the movement may be substantial. Actuators may be based on one or more vibrators, motors, solenoids, piezoelectric actuators, speaker coils, or any other desired device capable of mechanically (physically) moving device 500.

Some or all of movement generation circuitry such as actuators may be used to perform operations that are unrelated to rotation of device 500. For example, actuators may include vibrators that are actuated to issue a haptic alert or notification to a user of device 500. Such alerts may include, for example, a received text message alert identifying that device 500 has received a text message, a received telephone call alert, a received email alert, an alarm notification alert, a calendar notification alert, or any other desired notification. By actuating actuator, device 500 may inform the user of any desired device condition.

Motion sensor circuitry may sense motion of device 500 that is generated by movement generation circuitry. If desired, motion sensor circuitry may provide feedback signals associated with the sensed motion of device 500 to movement generation circuitry. Movement generation circuitry may use the feedback signals to control actuation of the movement generation circuitry.

Control circuitry 504 may use motion sensor circuitry and/or movement generation circuitry to determine the angle of arrival of wireless signals received by device 500 from another electronic device. For example, control circuitry 504 may use movement generation circuitry to move device 500 from one position to another. Motion sensor circuitry may be used to track the movement of device 500 as it is moved between the different positions. At each position, control circuitry 504 may receive wireless signals from another electronic device. Control circuitry 504 may process the received wireless signals together with the motion data from motion sensor circuitry to more accurately determine the position of the other electronic device. The use of motion generation circuitry is merely illustrative, however. If desired, motion sensor circuitry may track movement of device 500 that is not caused by motion generation circuitry. This may include a user's natural, unprompted movement of device 500 and/or the user's movement of device 500 after the user is prompted (by display, audio circuitry 510, a haptic output device in device 500, or any other suitable output device) to move device 500 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 508 may include radio-frequency transceiver circuitry for handling various radio-frequency communications bands. For example, wireless circuitry 508 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 500 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 534 on device 500 can include any applications installed on the device 500, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 506 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 506 can include a display and user input devices such as a keyboard, mouse, and/or trackpad. In some embodiments, I/O subsystem 506 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 502) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 506 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 500 can include a touchpad (not shown) for activating or deactivating particular functions. In some embodiments, the touchpad is a touch-sensitive area of the device 500 that, unlike the touch screen, does not display visual output. The touchpad can be a touch-sensitive surface that is separate from the touch-sensitive display or an extension of the touch-sensitive surface formed by the touch-sensitive display.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
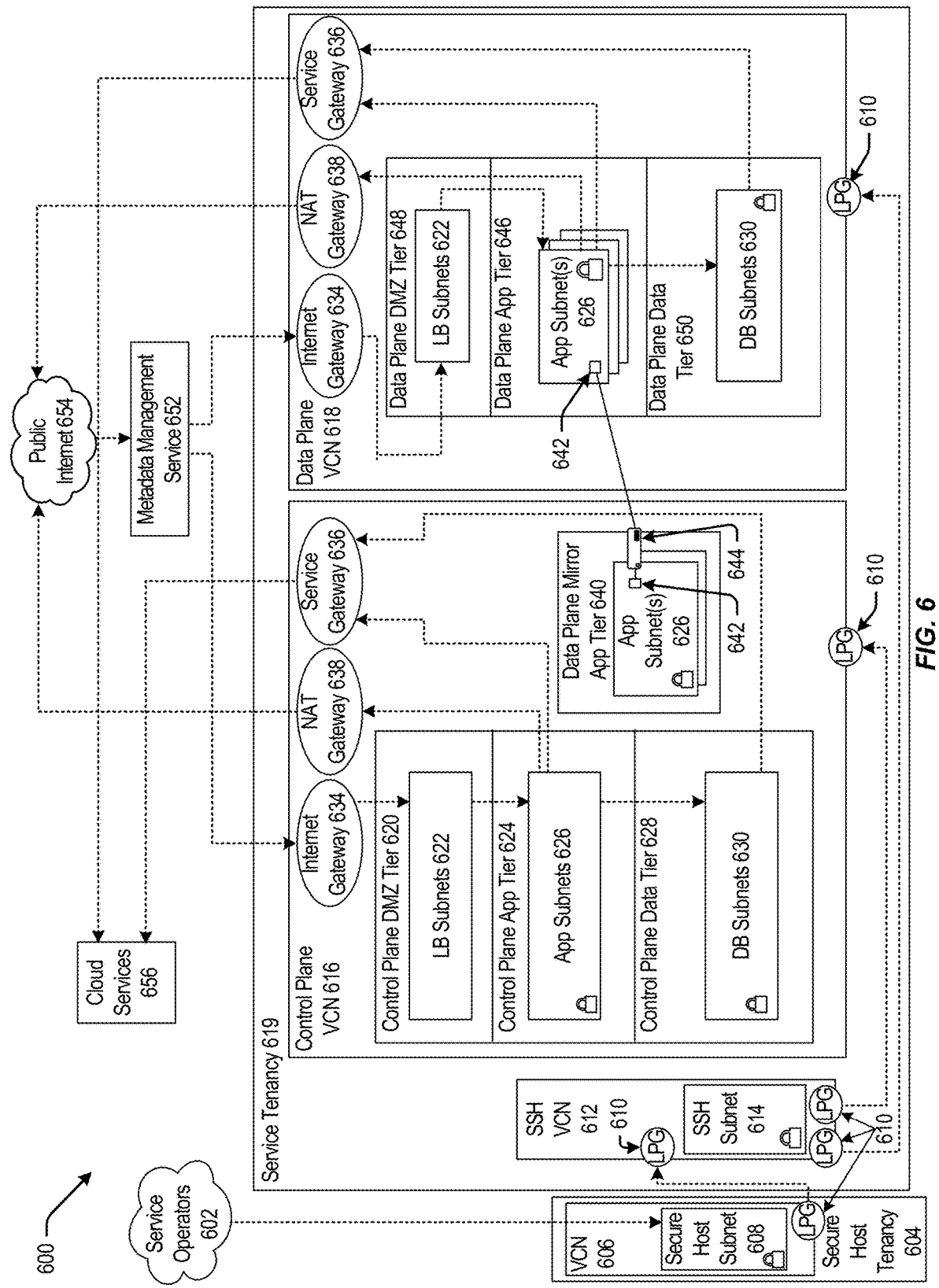
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
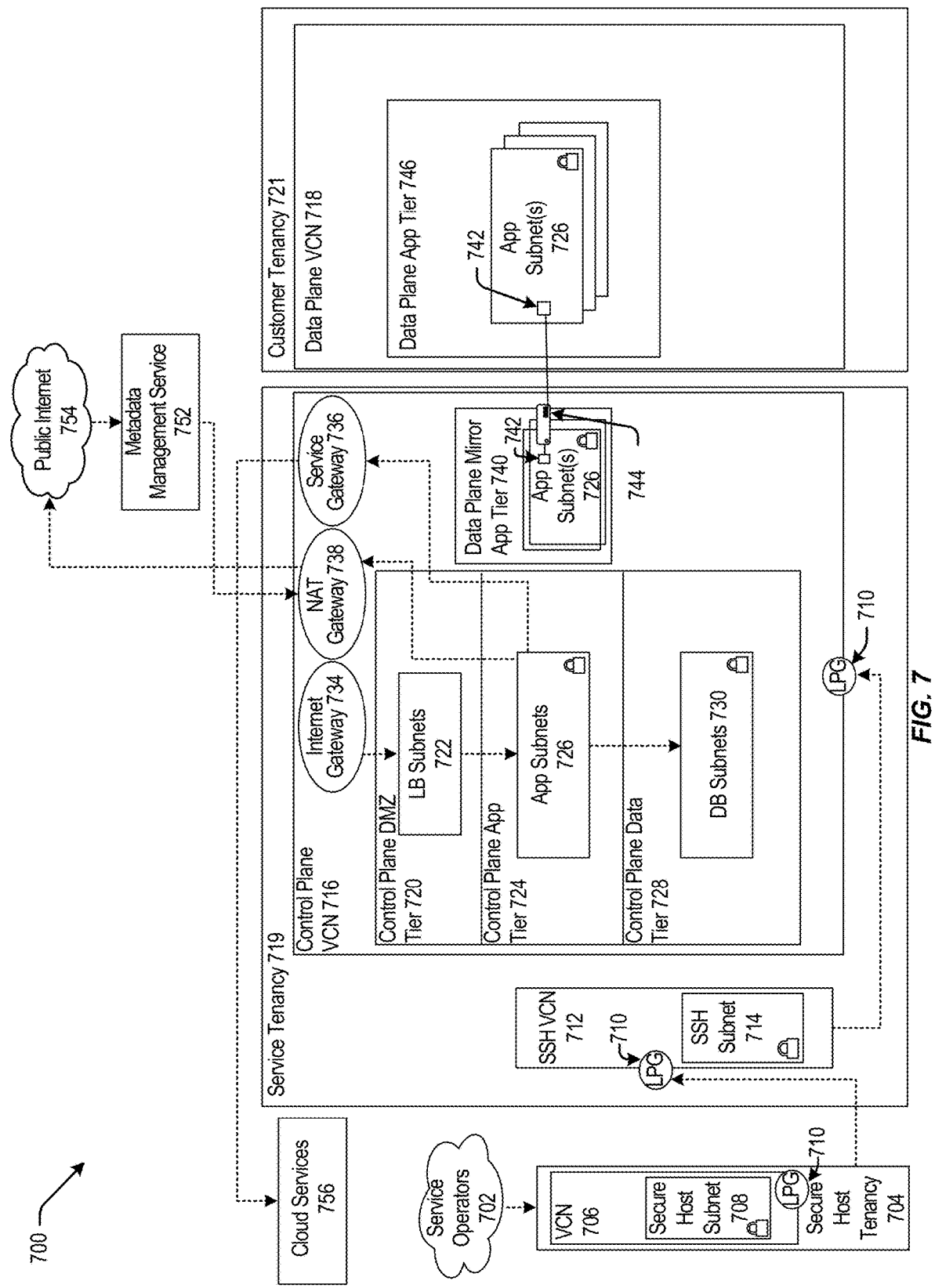
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 710 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
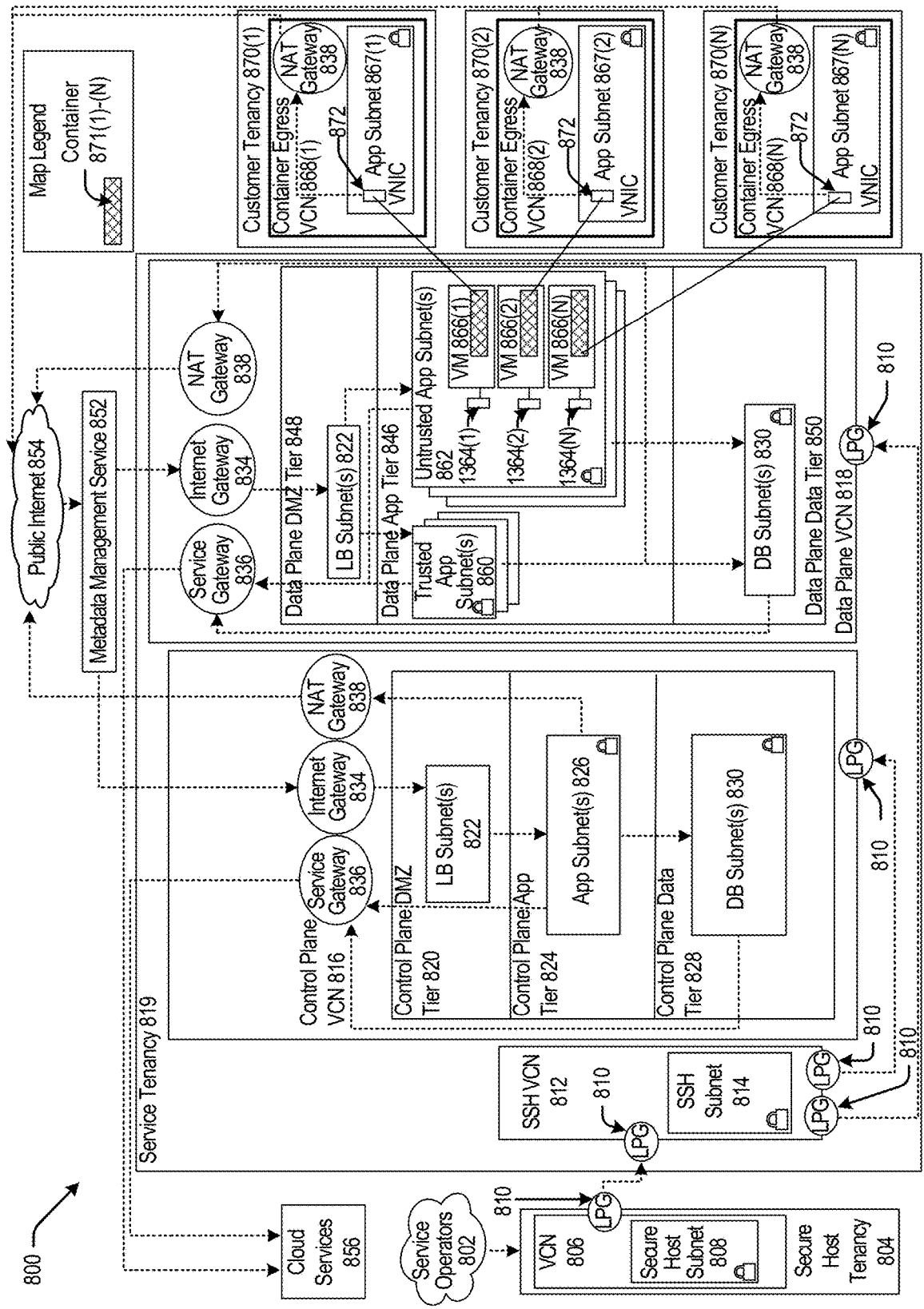
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
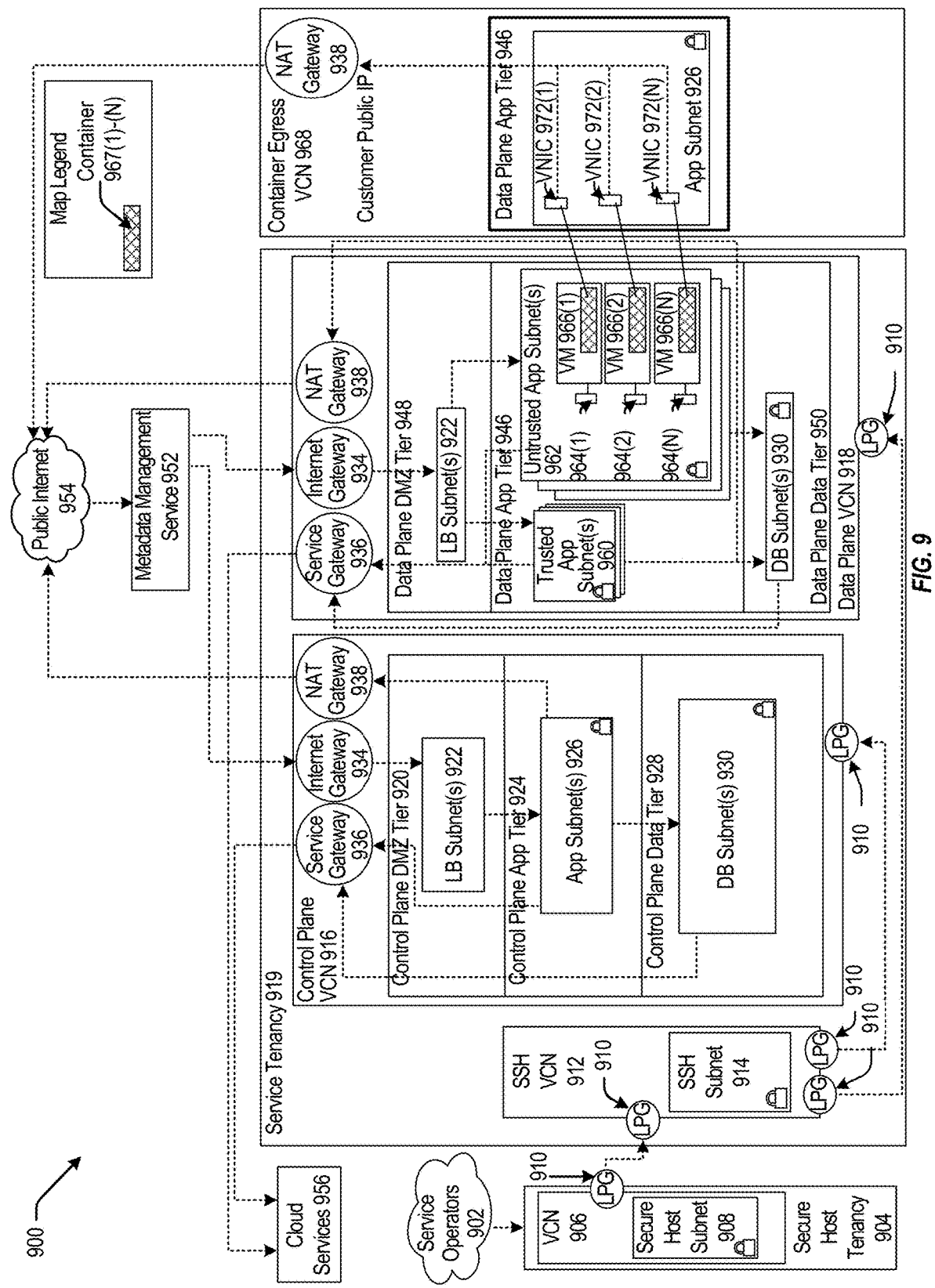
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
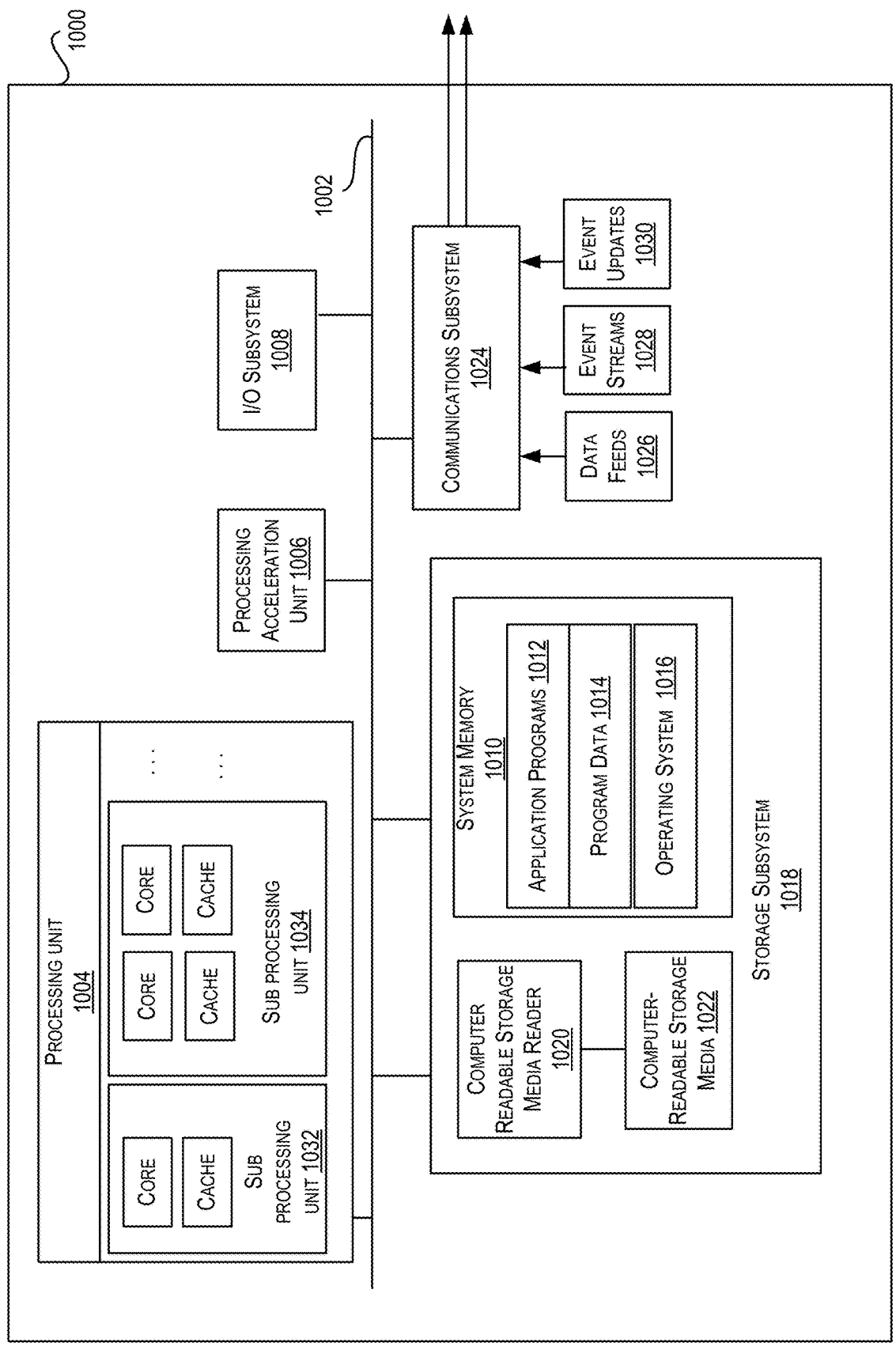
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    monitoring, by a robotic device, a physical space, the physical space comprising a portion of a datacenter;

detecting, by the robotic device, a person within the physical space;
attempting to authenticate the detected person by an authentication process comprising:
prompting, by the robotic device, the detected person to authenticate themselves;
receiving, by the robotic device, an authentication credential from the detected person, wherein the authentication credential comprises a work order that identifies one or more authorized servers in the portion of the datacenter;
accessing, by the robotic device, scheduling information that is associated with the authentication credential; and
determining, by the robotic device, whether the authentication of the detected person has passed based at least in part on the scheduling information;
determining, by the robotic device, whether the authentication of the detected person has failed based at least in part on determining that the detected person has interacted with a server that is not identified in the work order; and
in accordance with a determination that the authentication of the detected person has failed, performing an action commensurate with the determination that the authentication has failed.

2. The method of claim 1, wherein the detected person is authenticated for a time period.

3. The method of claim 1, wherein the detecting further comprises:
receiving, by the robotic device, a request to authenticate the person, the request comprising a wake phrase.

4. The method of claim 3, wherein the robotic device is configured to move towards a source of the request to authenticate the person.

5. The method of claim 1, wherein the person is attempted to be authenticated while the person remains in the physical space.

6. The method of claim 1, further comprising:
in response to the determination that the authentication of the detected person has passed, transmitting, by the robotic device, an instruction to open a lock.

7. The method of claim 6, wherein the authentication process further comprises:
storing a multimedia recording of the authentication process.

8. A system, comprising:
memory configured to store instructions; and
one or more processors configured to execute the instructions for:
monitoring, by a robotic device, a physical space, the physical space comprising a portion of a datacenter;
detecting, by the robotic device, a person within the physical space;
attempting to authenticate the detected person by an authentication process comprising:
prompting, by the robotic device, the detected person to authenticate themselves;
receiving, by the robotic device, an authentication credential from the detected person, wherein the authentication credential comprises a work order that identifies one or more authorized servers in the portion of the datacenter;
accessing, by the robotic device, scheduling information that is associated with the authentication credential;
determining, by the robotic device, whether the authentication of the detected person has passed based at least on the scheduling information;
determining, by the robotic device, that the authentication of the detected person has failed based at least in part on determining whether the detected person has interacted with a server that is not identified in the work order; and
in accordance with a determination that the authentication of the detected person has failed, performing an action commensurate with the determination that the authentication has failed.

9. The system of claim 8, wherein the detected person is attempted to be authenticated for a time period.

10. The system of claim 8, wherein the detecting further comprises:
receiving, by the robotic device, a request to authenticate the person, the request comprising a wake phrase.

11. The system of claim 10, wherein the robotic device is configured to move towards a source of the request to authenticate the person.

12. The system of claim 8, wherein the person is authenticated while the person remains in the physical space.

13. The system of claim 8, further comprising:
in response to the determination that the authentication of the detected person has passed, transmitting, by the robotic device, an instruction to open a lock.

14. The system of claim 13, wherein the authentication process further comprises:
storing a multimedia recording of the authentication process.

15. A non-transitory computer-readable medium storing a set of instructions that, when executed by one or more processors, cause the one or more processors to perform operations comprising:
monitoring, by a robotic device, a physical space, the physical space comprising a portion of a datacenter;
detecting, by the robotic device, a person within the physical space;
attempting to authenticate the detected person by an authentication process comprising:
prompting, by the robotic device, the detected person to authenticate themselves;
receiving, by the robotic device, an authentication credential from the detected person, wherein the authentication credential comprises a work order that identifies one or more authorized servers in the portion of the datacenter;
accessing, by the robotic device, scheduling information that is associated with the authentication credential; and
determining, by the robotic device, whether the authentication of the detected person has passed based at least in part on the scheduling information;
determining, by the robotic device, that the authentication of the detected person has failed based at least in part on determining whether the detected person has interacted with a server that is not identified in the work order; and
in accordance with a determination that the authentication of the detected person has failed, performing an action commensurate with the determination that the authentication has failed.

16. The medium of claim 15, wherein the detected person is authenticated for a time period.

17. The medium of claim 15, wherein the detecting further comprises:
- receiving, by the robotic device, a request to authenticate the person, the request comprising a wake phrase.

18. The medium of claim 17, wherein the robotic device is configured to move towards a source of the request to authenticate the person.

19. The medium of claim 15, wherein the person is attempted to be authenticated while the person remains in the physical space.

20. The medium of claim 15, further comprising:
- in response to the determination that the authentication of the detected person has passed, transmitting, by the robotic device, an instruction to open a lock.

* * * * *